US012460955B2

(12) United States Patent
Lenin et al.

(10) Patent No.: US 12,460,955 B2
(45) Date of Patent: Nov. 4, 2025

(54) SYSTEMS, APPARATUSES, AND METHODS FOR FLUID FLOW DETECTION

(71) Applicant: HONEYWELL INTERNATIONAL INC., Charlotte, NC (US)

(72) Inventors: Kaligaselvi Lenin, Bangalore (IN); Arunima Baiju, Bangalore (IN); Hitesh Saini, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 218 days.

(21) Appl. No.: 18/154,464

(22) Filed: Jan. 13, 2023

(65) Prior Publication Data
US 2024/0240977 A1 Jul. 18, 2024

(51) Int. Cl.
G01F 1/38 (2006.01)
G01L 7/08 (2006.01)
G01L 13/02 (2006.01)

(52) U.S. Cl.
CPC ............... *G01F 1/38* (2013.01); *G01L 7/082* (2013.01); *G01L 13/026* (2013.01)

(58) Field of Classification Search
CPC .... G01F 1/38–386; G01F 1/48; G01F 1/7086; G01N 15/14–149; G01N 2015/1402–1497
See application file for complete search history.

(56) References Cited

U.S. PATENT DOCUMENTS

| | | | | |
|---|---|---|---|---|
| 4,011,650 A | * | 3/1977 | Granada | G01L 9/0044 29/622 |
| 4,221,134 A | * | 9/1980 | Ekstrom, Jr. | G01L 9/0055 73/861.47 |
| 4,285,246 A | * | 8/1981 | Kita | G01F 1/704 73/861.03 |
| 4,312,234 A | * | 1/1982 | Rhodes | G01F 1/383 73/861.04 |
| 4,555,952 A | | 12/1985 | Jenkins | |
| 5,040,890 A | * | 8/1991 | North, Jr. | G05D 16/028 356/73 |
| 5,303,731 A | | 4/1994 | Vavra et al. | |
| 5,469,749 A | * | 11/1995 | Shimada | G01F 1/383 73/861.47 |
| 6,725,731 B2 | | 4/2004 | Wiklund et al. | |
| 9,759,625 B2 | | 9/2017 | Turner et al. | |

(Continued)

Primary Examiner — Alexander A Mercado
(74) Attorney, Agent, or Firm — ALSTON & BIRD LLP

(57) ABSTRACT

An example system and an associated method are provided herein. In some embodiments, the system may include a flow channel having an inlet port and an outlet port. In some embodiments, the system may include a pressure sensor having a first port and a second port. In some embodiments, the system may include a first diaphragm disposed on the first port and a second diaphragm disposed on the second port. In some embodiments, the first diaphragm is in fluid communication with the inlet port and the second diaphragm is in fluid communication with the outlet port. In some embodiments, the pressure sensor is configured to determine a pressure difference between the inlet port and the outlet port. In some embodiments, the system may include a computing device, the computing device configured to determine a flow rate of a fluid in the flow channel based at least on the pressure difference.

11 Claims, 7 Drawing Sheets

(56) References Cited

U.S. PATENT DOCUMENTS

| | | | |
|---|---|---|---|
| 2007/0073417 A1* | 3/2007 | Hedtke | G01F 1/383 700/1 |
| 2008/0154535 A1* | 6/2008 | Sparks | G05B 19/0425 702/173 |
| 2010/0132471 A1* | 6/2010 | Hedtke | G01L 13/02 73/702 |
| 2011/0038524 A1* | 2/2011 | Ichitani | G01N 33/4905 382/134 |
| 2013/0074604 A1* | 3/2013 | Hedtke | G01L 19/0084 73/753 |
| 2024/0110858 A1* | 4/2024 | Kishore | G01N 15/147 |

* cited by examiner

SYSTEMS, APPARATUSES, AND METHODS FOR FLUID FLOW DETECTION

TECHNOLOGICAL FIELD

Embodiments of the present disclosure relate generally to systems, apparatuses, and methods for fluid flow detection and/or fluid analysis.

BACKGROUND

Applicant has identified many technical challenges and difficulties associated with systems, apparatuses, and methods for fluid flow detection and/or fluid analysis. Through applied effort, ingenuity, and innovation, Applicant has solved problems related to systems, apparatuses, and methods for fluid flow detection and/or fluid analysis by developing solutions embodied in the present disclosure, which are described in detail below.

BRIEF SUMMARY

Various embodiments described herein relate to systems, apparatuses, and methods for fluid flow detection and/or fluid analysis.

In accordance with one aspect of the disclosure, a system is provided. In some embodiments, the system may include a flow channel having an inlet port and an outlet port. In some embodiments, the flow channel is configured to receive a fluid via the inlet port and discharge the fluid via the outlet port. In some embodiments, the system may include a pressure sensor having a first port and a second port. In some embodiments, the system may include a first diaphragm disposed on the first port and a second diaphragm disposed on the second port. In some embodiments, the first diaphragm is in fluid communication with the inlet port and the second diaphragm is in fluid communication with the outlet port. In some embodiments, the pressure sensor is configured to determine a pressure difference between the inlet port and the outlet port. In some embodiments, the system may include a computing device, the computing device configured to determine a flow rate of the fluid based at least on the pressure difference.

In some embodiments, the pressure sensor comprises a pressure diaphragm.

In some embodiments, the first diaphragm and the second diaphragm are configured to prevent the fluid from contacting the pressure sensor.

In some embodiments, the first diaphragm and the second diaphragm are associated with an elasticity.

In some embodiments, the elasticity is based on young's modulus.

In some embodiments, the flow channel is associated with a resistance.

In some embodiments, the flow rate is equal to the pressure difference divided by the resistance.

In some embodiments, the flow channel is substantially rectangular or substantially cylindrical.

In some embodiments, the flow channel is associated with a first resistance when the flow channel is substantially rectangular and a second resistance when the flow channel is substantially cylindrical.

In some embodiments, wherein the pressure difference is equal to a difference between a first pressure associated with the first port and a second pressure associated with the second port.

In some embodiments, the system may include a camera. In some embodiments, the camera is configured to capture one or more images of the fluid when the fluid is in the flow channel In some embodiments, the camera is configured to capture the one or more images of the fluid when the flow rate is equal to zero.

In accordance with another aspect of the disclosure, a method of manufacturing is provided. In some embodiments, the method may include providing a flow channel having an inlet port and an outlet port. In some embodiments, the flow channel is configured to receive a fluid via the inlet port and discharge the fluid via the outlet port. In some embodiments, the method may include providing a pressure sensor having a first port and a second port. In some embodiments, the method may include providing a first diaphragm disposed on the first port and a second diaphragm disposed on the second port. In some embodiments, the first diaphragm is in fluid communication with the inlet port and the second diaphragm is in fluid communication with the outlet port. In some embodiments, the pressure sensor is configured to determine a pressure difference between the inlet port and the outlet port. In some embodiments, the method may include providing a computing device, the computing device configured to determine a flow rate of the fluid based at least on the pressure difference.

In some embodiments, the pressure sensor comprises a pressure diaphragm.

In some embodiments, the first diaphragm and the second diaphragm are configured to prevent the fluid from contacting the pressure sensor.

In some embodiments, the first diaphragm and the second diaphragm are associated with an elasticity.

In some embodiments, the flow channel is associated with a resistance.

In some embodiments, the flow rate is equal to the pressure difference divided by the resistance.

In some embodiments, the pressure difference is equal to a difference between a first pressure associated with the first port and a second pressure associated with the second port.

In some embodiments, the method may include providing a camera. In some embodiments, the camera is configured to capture one or more images of the fluid when the flow rate is equal to zero.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
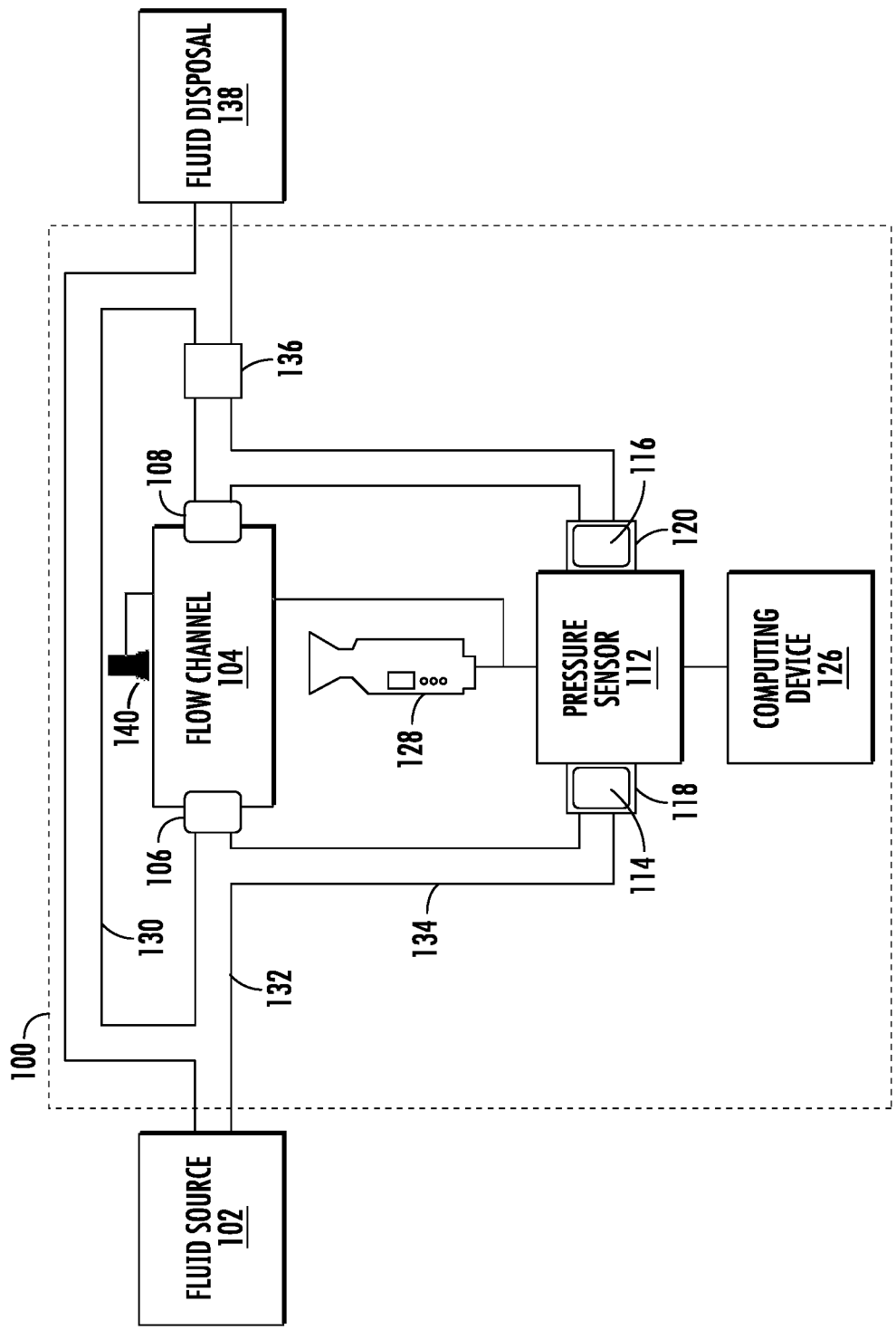
FIG. 1 illustrates an overview of an example system in accordance with one or more embodiments of the present disclosure.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with systems, apparatuses, and methods for fluid flow detection and/or fluid analysis. As would be understood by one skilled in the field to which this disclosure pertains, there are numerous example scenarios in which a user may use systems, apparatuses, and methods for fluid flow detection and/or fluid analysis.

In many applications, it is often necessary to perform fluid flow detection and/or fluid analysis. For example, in many applications, fluid may be received into a system from a fluid source (e.g., a human) for the system to perform analysis on the fluid (e.g., through capturing images of the fluid). In some examples, in order to perform analysis of the fluid, the flow rate of the fluid must be approximately equal to zero to accurately perform the analysis.

An example solution for fluid flow detection and/or analysis fluid includes, for example, measuring the fluid flow using an invasive pressure sensor (e.g., a pressure sensor that comes into contact with the fluid and may have to be disposed after a single use) to determine if the fluid flow is approximately equal to zero before analyzing the fluid. In this regard, in such examples, measuring fluid flow using an invasive pressure sensor includes the fluid coming into contact with the pressure sensor. However, in many applications if the fluid comes into contact with the pressure sensor, the pressure sensor cannot be reused due to sanitary constraints (e.g., such as applications in which the fluid is associated with fluid extracted from a human), which may be unsanitary and expensive. Another example solution for fluid flow detection and/or analysis, includes separating the fluid received from a fluid source and/or system that is extracting the fluid from the fluid source into a storage in which the fluid may have a flow rate of approximately zero such that the fluid analysis can be performed once the fluid is in the storage. However, such an example solution includes excessive handling of the fluid (e.g., a technician must separate the fluid from the system that is receiving the fluid from the fluid source) and requires excess equipment (a separate storage and system for analyzing the fluid) to perform the fluid flow detection and/or fluid analysis, which may be unsanitary, inefficient, and expensive. Accordingly, there is a need for systems, apparatuses, and methods that can perform fluid flow detection and/or fluid analysis in an efficient, cost-effective, and sanitary manner.

Thus, to address these and/or other issues related to systems, apparatuses, and methods for fluid flow detection and/or fluid analysis, example systems, apparatuses, and methods for fluid flow detection and/or fluid analysis are disclosed herein. For example, an embodiment in this disclosure, described in greater detail below, includes a system that includes a flow channel having an inlet port and an outlet port. The flow channel may be configured to receive a fluid via the inlet port and discharge the fluid via the outlet port. In some embodiments, the system includes a first diaphragm disposed on the first port and a second diaphragm disposed on the second port. In some embodiments, the system includes a pressure sensor having a first port and a second port. In some embodiments, the first diaphragm is in fluid communication with the inlet port and the second diaphragm is in fluid communication with the outlet port. In some embodiments, the pressure sensor is configured to determine a pressure difference between the inlet port and the outlet port. In some embodiments, the system includes a computing device and the computing device may be configured to determine a flow rate of the fluid based at least on the pressure difference. In some embodiments, the first diaphragm and the second diaphragm are configured to prevent the fluid from contacting the pressure sensor, such that the pressure sensor can be reused. Accordingly, embodiments herein provide for fluid flow detection and/or fluid analysis in an efficient and cost-effective manner.

Example System

With reference to FIGS. 1-4, embodiments herein provide for a system 100. In some embodiments, the system 100 may be configured for fluid flow detection and/or fluid analysis.

In some embodiments, the system 100 may receive fluid from a fluid source 102. In this regard, for example, the fluid source 102 may provide fluid to the system 100. In some embodiments, the fluid source 102 may be a human. For example, the fluid source 102 may be a human undergoing a peritoneal dialysis process. As another example, the fluid source 102 may be a collection of fluid that has previously been extracted from a human (e.g., the fluid source 102 may be a bag of fluid that has previously been collected from a human). In some embodiments, the fluid may be received from the fluid source 102 such that the system 100 can analyze the fluid. In some embodiments, the fluid source 102 may provide the fluid to the system 100 at a flow rate of between 80 milliliters per minute to 100 milliliters per minute.

In some embodiments, the system 100 may discharge fluid to a fluid disposal 138. In this regard, for example, the fluid disposal 138 may receive fluid from the system 100. The fluid disposal 138 may be, for example, a housing configured to collect fluid that has been discharged from the system 100 such that the fluid can be disposed. In some embodiments, for example, the fluid disposal 138 may receive the fluid from the system 100 after the system 100 has analyzed the fluid.

In some embodiments, the system 100 may include a flow channel 104. In some embodiments, the flow channel 104 may include an inlet port 106 and/or an outlet port 108. In some embodiments, the flow channel 104 may be configured to receive fluid into the flow channel 104 via the inlet port 106. For example, the flow channel 104 may receive fluid via the inlet port 106 from the fluid source 102 via a bypass tube 132. In some embodiments, the flow channel 104 may be configured to discharge fluid from the flow channel 104 via the outlet port 108. For example, the flow channel 104 may be configured to discharge the fluid via the outlet port 108 to the fluid disposal 138 via the bypass tube 132. In some embodiments, the flow channel 104 may comprise a polymer, such as a transparent polymer. In this regard, for example, the flow channel 104 may comprise a transparent polymer associated with a high optical quality for image capture (e.g., the flow channel 104 may comprise a transparent polymer that is easy to see through).

Figure 2:
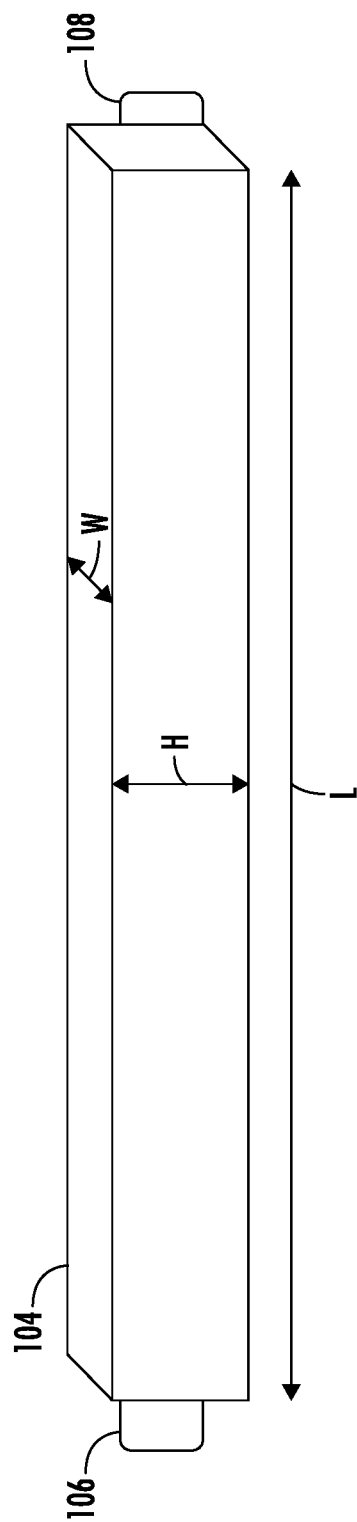
FIG. 2 illustrates a perspective view of an example flow channel in accordance with one or more embodiments of the present disclosure.
Figure 3:
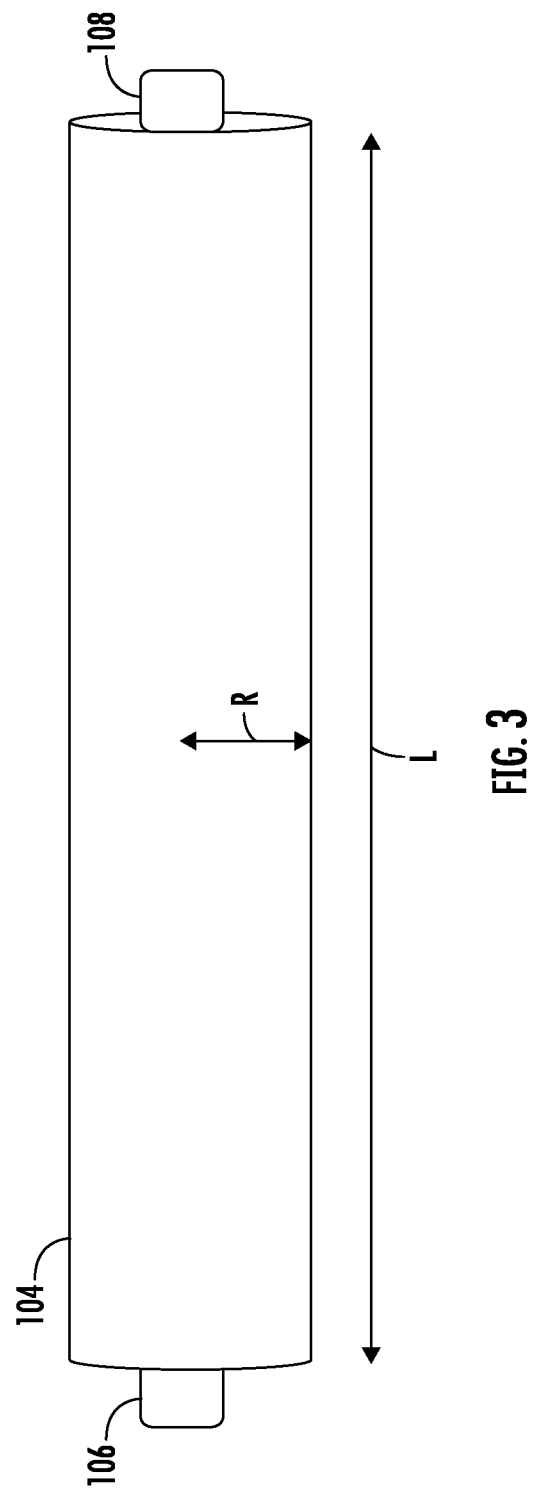
FIG. 3 illustrates a perspective view of an example flow channel in accordance with one or more embodiments of the present disclosure.
Figure 4:
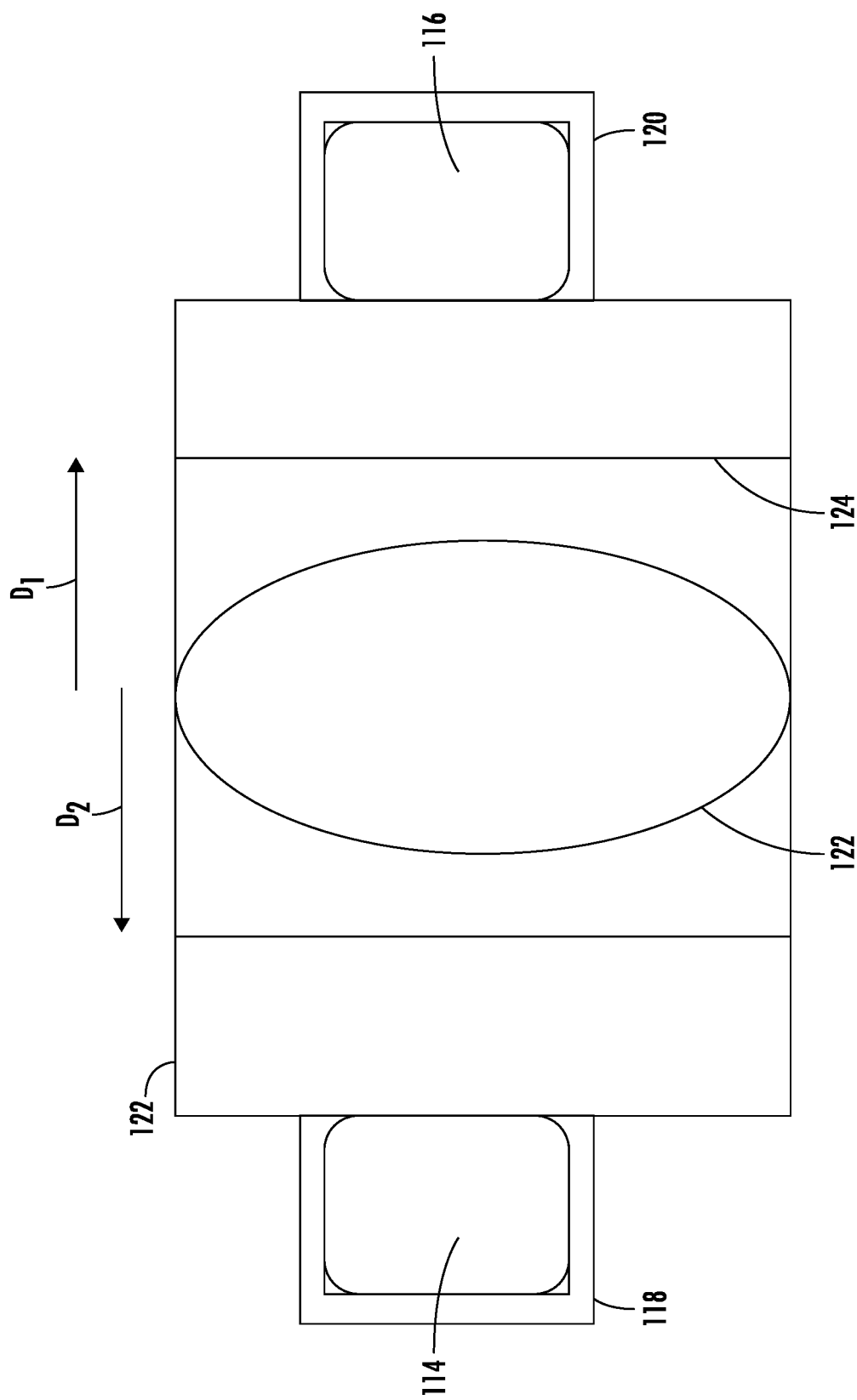
FIG. 4 illustrates a cross sectional view of an example pressure sensor in accordance with one or more embodiments of the present disclosure.

In some embodiments, such as depicted in FIG. 2, the flow channel 104 may be substantially rectangular. In this regard, the flow channel 104 may have a length (L), a height (H), and a width (W). In some embodiments, such as depicted in FIG. 3, the flow channel 104 may be substantially cylindrical. In this regard, the flow channel 104 may have a length (L) and a radius (R).

In some embodiments, the flow channel 104 may be associated with a resistance. In this regard, for example, the resistance of the flow channel 104 may be an indication or a measurement of the flow channel's 104 ability to restrict fluid flow through the flow channel 104. In some embodiments, such as when the flow channel 104 is substantially rectangular, the resistance the of the flow channel 104 may be calculated based on equation (1):

$$\text{Resistance} = \frac{12\,\mu L}{WH^3\left(1 - \frac{.630\,H}{W}\right)}, \quad (1)$$

where L represents the length of the flow channel 104, W represents the width of the flow channel 104, H represents the height of the flow channel 104, and μ represents the viscosity of the fluid. In some embodiments, such as when the flow channel 104 is substantially cylindrical, the resistance of the flow channel 104 may be calculated based on equation (2):

$$\text{Resistance} = \frac{8\,\mu L}{\pi R^4}, \quad (2)$$

where L represents the length of the flow channel 104, R represents the radius of the flow channel 104, and μ represents the viscosity of the fluid.

In some embodiments, the system 100 may be include a pressure sensor 112. In some embodiments, the pressure sensor 112 may have a first port 114 and a second port 116. In some embodiments, the first port 114 may be connected to the inlet port 106 of the flow channel 104 via at least a pressure sensor tube 134. In some embodiments, the second port 116 may be connected to the outlet port 108 of the flow channel 104 via at least the pressure sensor tube 134.

In some embodiments, the pressure sensor 112 may be configured to determine a pressure difference between the inlet port 106 and the outlet port 108 of the flow channel 104. In this regard, in some embodiments, the pressure sensor 112 may include a pressure diaphragm 122 and/or frame 124. In some embodiments, the pressure diaphragm 122 may be configured to move along the frame 124 in order to determine the pressure difference between the inlet port 106 and the outlet port 108 of the flow channel 104. For example, if the pressure is greater at the inlet port 106 than at the outlet port 108, the pressure diaphragm 122 may be configured to move along the frame 124 in direction $D_1$. In some embodiments, the greater the pressure at the inlet port 106 is than the pressure at the outlet port 108, the greater the pressure diaphragm 122 moves in direction $D_1$. As another example, if the pressure is greater at the outlet port 108 than at the inlet port 106, the pressure diaphragm 122 may be configured to move along the frame 124 in direction $D_2$. In some embodiments, the greater the pressure at the outlet port 108 is than the pressure at the inlet port 106, the greater the pressure diaphragm 122 moves in direction $D_2$. As another example, if the pressure at the inlet port 106 is equal to the pressure at the outlet port 108, the pressure diaphragm 122 may be configured to stay in place (e.g., the pressure diaphragm 122 does not move in direction $D_1$ or direction $D_2$). In some embodiments, the pressure diaphragm 122 may comprise silicon. In some embodiments, the frame 124 may comprise epoxy resin and/or gel.

In some embodiments, the system 100 may include a first diaphragm 118 and/or a second diaphragm 120. In some embodiments, the first diaphragm 118 may be disposed on the first port 114 of the pressure sensor 112. In this regard, the first diaphragm 118 may be disposed between the pressure sensor 112 (e.g., the first port 114 of the pressure sensor 112) and the pressure sensor tube 134 such that the first diaphragm 118 is in fluid communication with the inlet port 106. In some embodiments, the first diaphragm 118 may be configured to prevent fluid (e.g., fluid from the fluid source 102, flow channel 104, etc.) from contacting the pressure sensor 112 (e.g., the fluid does not contact the first port 114, enter the pressure sensor 112, contact the frame 124, and/or contact the pressure diaphragm 122). In some embodiments, the second diaphragm 120 may be disposed on the second port 116 of the pressure sensor 112. In this regard, the second diaphragm 120 may be disposed between the pressure sensor 112 (e.g., the second port 116 of the pressure sensor 112) and the pressure sensor tube 134 such that the second diaphragm 120 is in fluid communication with the outlet port 108. In some embodiments, the second diaphragm 120 may be configured to prevent fluid (e.g., fluid from the fluid source 102, flow channel 104, etc.) from contacting the pressure sensor 112 (e.g., the fluid does not contact the second port 116, enter the pressure sensor 112, contact the frame 124, and/or contact the pressure diaphragm 122). Said differently, the first diaphragm 118 and the second diaphragm 120 may be configured to deflect based on the pressure at the inlet port 106 and the outlet port 108, which causes the pressure diaphragm 122 to correspondingly deflect without the pressure sensor 112 (e.g., the first port 114, the second port 116, the pressure diaphragm 122, and/or the frame 124) coming into contact with the fluid. In this regard, the pressure sensor 112 may be reused (e.g., the pressure sensor 112 is non-invasive). For example, the pressure sensor 112 may be reused with more than one fluid sources 102 (e.g., with more than one human undergoing a peritoneal dialysis process).

Figure 5:
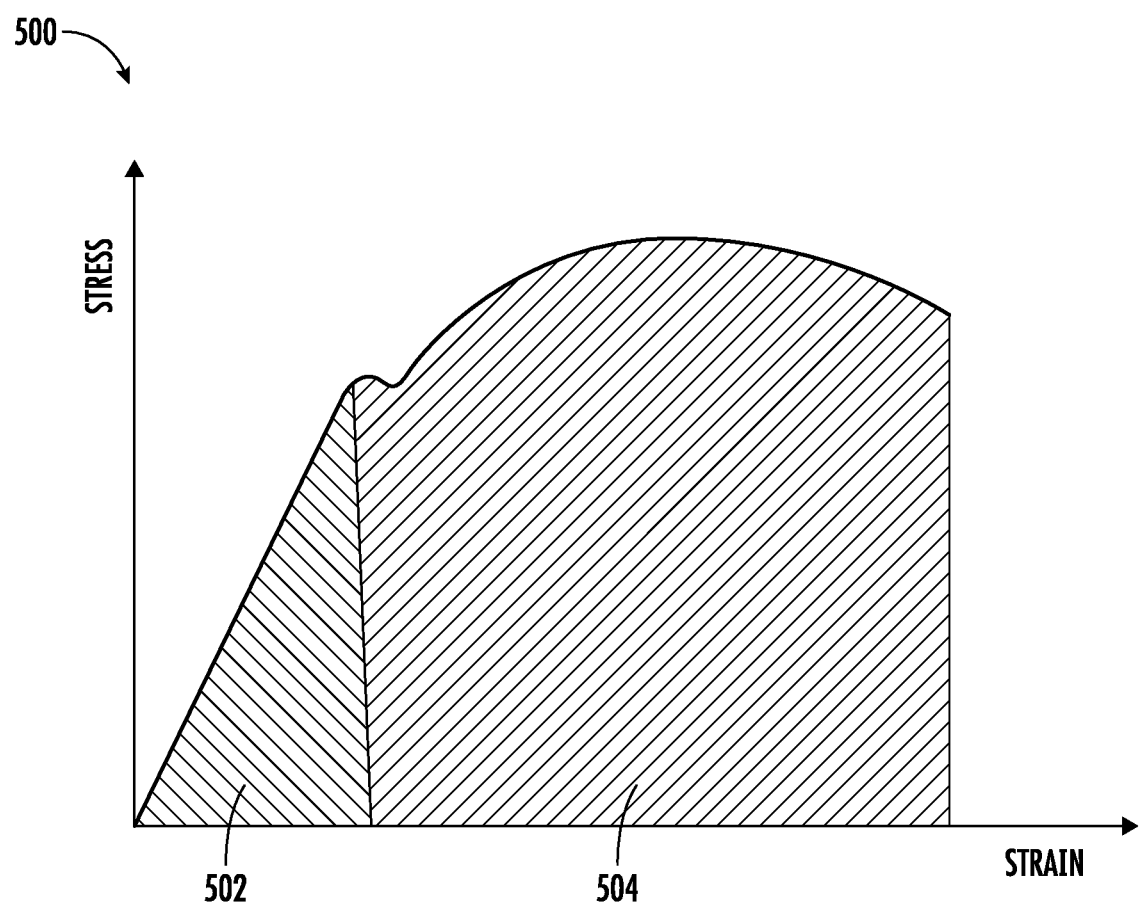
FIG. 5 illustrates an example graph in accordance with one or more embodiments of the present disclosure.

In some embodiments, such as depicted in FIG. 5, the first diaphragm 118 and/or the second diaphragm 120 may be comprised of one or more materials based on Young's modulus 500. In some embodiments, Young's modulus 500 may have a modulus of resilience region 502 and a modulus of toughness region 504. In some embodiments, the first diaphragm 118 and/or the second diaphragm 120 may comprise one or more materials based on the modulus of resilience region 502. In this regard, for example, the first diaphragm 118 and/or the second diaphragm 120 may be comprises of one or more of rubber, thermoplastic elastomer (TPE), and/or polytetrafluoroethylene (PTFE).

In some embodiments, the system 100 may be configured to analyze the fluid when the fluid is in the flow channel 104 (e.g., in the chamber 110 of the flow channel 104). In this regard, the system 100 may include one or more analysis apparatuses, such as camera 128 and/or optical light source 140 (e.g., a laser beam). In some embodiments, the camera 128 and/or optical light source 140 may be configured to capture one or more images of the fluid in the flow channel 104. For example, the camera 128 and/or optical light source 140 may be configured to capture one or more holographic images of the fluid in the flow channel 104. In this regard, for example, the one or more images (e.g., holographic images) of the fluid in the flow channel 104 may be used to determine a white blood cell count associated with the fluid and/or a red blood cell count associated with the fluid.

In some embodiments, in order to analyze the fluid when the fluid is in the flow channel 104 (e.g., using the camera 128 and/or the optical light source 140), a flow rate of the fluid in the flow channel 104 must be approximately equal to zero (e.g., the fluid in the flow channel 104 is not flowing). Accordingly, in some embodiments, the system 100 may include a computing device 126 configured to determine the flow rate of the fluid in the flow channel 104 (e.g., detect if there is any fluid flow in the flow channel 104). In some embodiments, the flow rate of the fluid in the flow channel 104 may be equal to the pressure difference between the inlet port 106 and the outlet port 108 (e.g., the pressure difference determined by the pressure sensor 112) divided by the resistance associated with the flow channel 104.

In some embodiments, if the computing device 126 determines that the flow rate of the fluid in the flow channel 104 is approximately equal to zero, the system 100 may be configured to analyze the fluid in the flow channel 104. For example, the camera 128 and/or the optical light source 140 may capture one or more images (e.g., holographic images) of the fluid in the flow channel 104 to determine a white blood cell count associated with the fluid and/or a red blood cell count associated with the fluid.

In some embodiments, if the computing device 126 determines that the flow rate of the fluid in the flow channel 104 is not approximately equal to zero (e.g., is between 80 milliliters a minute to 100 milliliters a minute), the system 100 may be configured to cause the fluid flow rate in the flow channel 104 to change to approximately zero. In some embodiments, the system 100 may include a valve (e.g., a pinch valve) 136 that may be actuated to a closed position to cause the fluid flow rate in the flow channel 104 to change to approximately zero. In some embodiments, once the computing device 126 determines that the flow rate of the fluid in the flow channel 104 is approximately equal to zero (e.g., after the valve 136 has been actuated to the closed position), the system 100 may be configured to analyze the fluid in the flow channel 104 (e.g., the camera 128 and/or the optical light source 140 may capture one or more images of the fluid in the flow channel 104 to determine a white blood cell count associated with the fluid and/or a red blood cell count associated with the fluid).

Although the computing device 126, the pressure sensor 112, the camera 128, and the optical light source 140 are depicted as separate components of the system 100 in FIG. 1, it would be understood by one skilled to which this disclosure pertains that, in some embodiments, the computing device 126, the pressure sensor 112, the camera 128, and/or the optical light source 140 may be combined into a single component and/or multiple components. For example, the computing device 126 and the pressure sensor 112 may be combined into a single component. As another example, the computing device 126 and the camera 128 may be combined into a single component. As another example, the camera 128 and the optical light source 140 may be combined into a single component. As another example, the computing device 126, the pressure sensor 112, the camera 128, and the optical light source 140 may be combined into a single component.

In some embodiments, after the system 100 analyzes the fluid in the flow channel 104 (e.g., after the camera 128 and/or the optical light source 140 has captured one or more images of the fluid in the flow channel 104), the flow channel 104 may be configured to discharge fluid from the flow channel 104 via the outlet port 108 (e.g., discharge the fluid via the outlet port 108 to the fluid disposal 138 via the bypass tube 132). In this regard, the valve 136 may be actuated to an open position such that the fluid may be discharged to the fluid disposal 138 via the bypass tube 132.

In some embodiments, the system 100 may be configured to not analyze at least some of the fluid that is received from the fluid source 102. For example, the system 100 may be configured to not analyze at least some of the fluid that is received from the fluid source 102 when the system 100 is currently analyzing fluid in the flow channel 104 that has been previously received by the system 100. Said differently, in some embodiments, the system 100 may continue to receive fluid from the fluid source 102 while the system 100 is currently analyzing previously received fluid in the flow channel 104, such that is not necessary and/or possible for recently received fluid to be analyzed. As another example, the system 100 may be configured to not analyze at least some of the fluid that is received from the fluid source 102 when the system 100 has recently analyzed fluid in the flow channel 104 that has been previously received by the system 100. Said differently, in some embodiments, it may only be necessary for the system 100 to periodically analyzing fluid received from the fluid source 102 (e.g., every ten minutes), such that it is not necessary for recently received fluid to be analyzed. As another example, the system 100 may be configured to not analyze at least some of the fluid that is received from the fluid source 102 when the system 100 has not been instructed to analyze fluid in the flow channel 104. Said differently, in some embodiments, the system 100 may only analyze fluid in the flow channel 104 when the system 100 is instructed to analyze fluid in the flow channel 104 (e.g., when an instruction to analyze fluid in the flow channel 104 is received by the computing device 126). As another example, the system 100 may be configured to not analyze at least some of the fluid that is received from the fluid source 102 when the system 100 only needs to analyze a portion of the fluid received by the system 100. Said differently, in some embodiments, the system 100 may only need to analyze a portion of the fluid received from the fluid source 102 in order to perform the necessary analysis (e.g., the system 100 only needs to analyze a portion of the fluid received by the system 100 to determine a white blood cell count associated with the fluid and/or a red blood cell count associated with the fluid).

In some embodiments, when the system 100 is configured to not analyze at least some of the fluid that is received from the fluid source 102, at least some of the fluid received by the system 100 may flow directly through the system 100 from the fluid source 102 to the fluid disposal 138 (e.g., without passing through the flow channel 104 and/or being analyzed by the system 100). In this regard, the system 100 may include a main tube 130 through which at least some of the fluid received by the system 100 from the fluid source 102 may flow directly from the fluid source 102 to the fluid disposal 138.

Example Method

Figure 6:
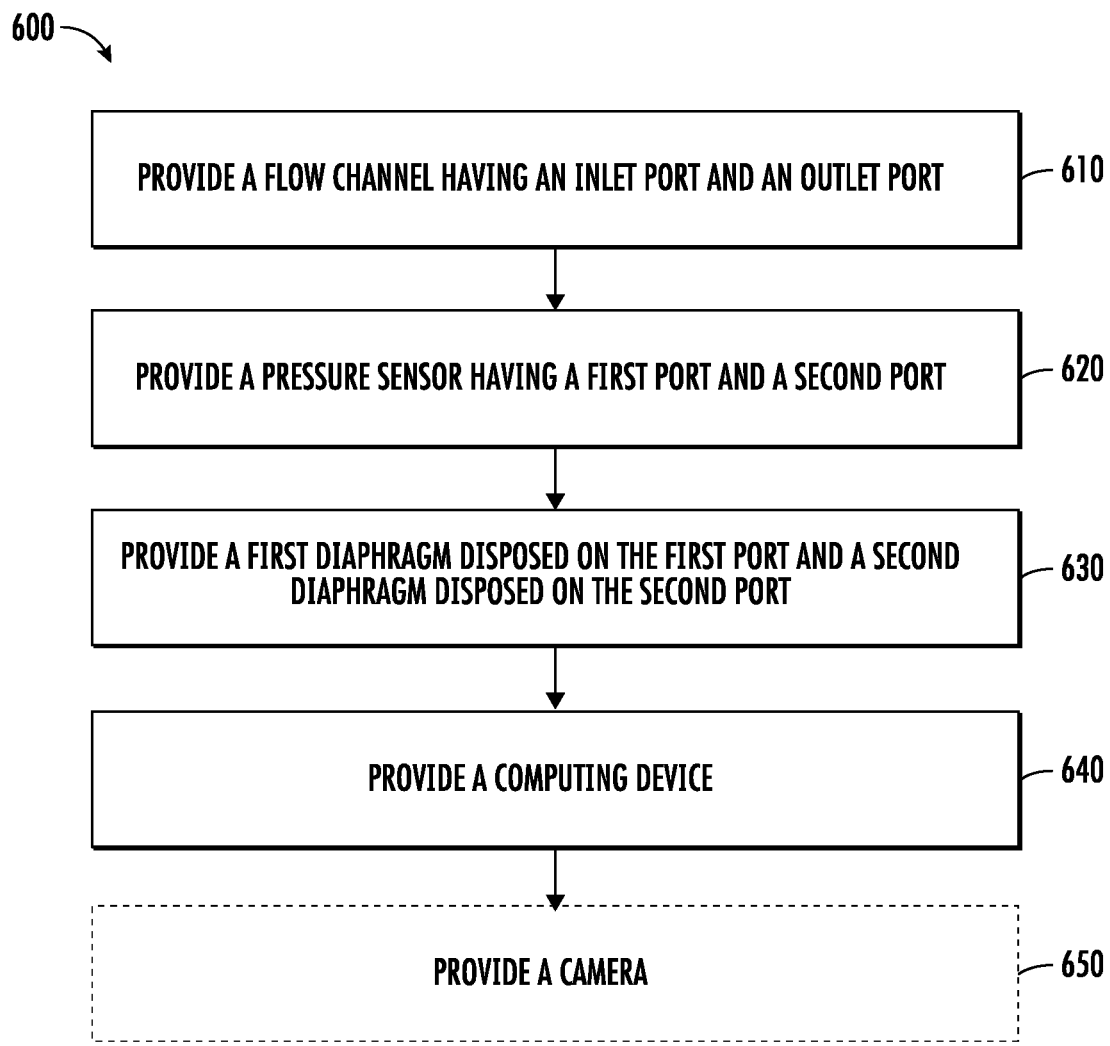
FIG. 6 illustrates a flowchart of an example method of manufacturing in accordance with one or more embodiments of the present disclosure.

Referring now to FIG. 6, a flowchart providing an example method of manufacturing 600 is illustrated.

As shown in block 610, the method 600 may include providing a flow channel having an inlet port and an outlet port. As described above, in some embodiments, the fluid channel may be configured to receive fluid into the flow channel via the inlet port. For example, the flow channel may receive fluid via the inlet port from the fluid source via a bypass tube. In some embodiments, the flow channel may be configured to discharge fluid from the flow channel via the outlet port. For example, the flow channel may be configured to discharge the fluid via the outlet port to the fluid disposal via the bypass tube. In some embodiments, the flow channel may comprise a polymer, such as a transparent polymer. In this regard, for example, the flow channel may comprise a transparent polymer associated with a high optical quality for image capture (e.g., the flow channel may comprise a transparent polymer that is easy to see through).

In some embodiments, the flow channel may be substantially rectangular. In this regard, the flow channel may have a length (L), a height (H), and a width (W). In some embodiments, the flow channel may be substantially cylindrical. In this regard, the flow channel may have a length (L) and a radius (R).

In some embodiments, the flow channel may be associated with a resistance. In this regard, for example, the resistance of the flow channel may be an indication or a measurement of the flow channel's ability to restrict fluid flow through the flow channel of the fluid's ability to travel through the flow channel. In some embodiments, such as when the flow channel is substantially rectangular, the resistance the of the flow channel may be calculated based on equation (1):

$$\text{Resistance} = \frac{12\,\mu L}{WH^3\left(1 - \frac{.630\,H}{W}\right)}, \tag{1}$$

where L represents the length of the flow channel, W represents the width of the flow channel, H represents the height of the flow channel, and μ represents the viscosity of the fluid. In some embodiments, such as when the flow channel is substantially cylindrical, the resistance of the flow channel may be calculated based on equation (2):

$$\text{Resistance} = \frac{8\,\mu L}{\pi R^4}, \tag{2}$$

where L represents the length of the flow channel, R represents the radius of the flow channel, and μ represents the viscosity of the fluid.

As shown in block 620, the method 600 may include providing a pressure sensor having a first port and a second port. As described above, in some embodiments, the pressure sensor may be configured to determine a pressure difference between the inlet port and the outlet port of the flow channel. In this regard, in some embodiments, the pressure sensor may include a pressure diaphragm and/or frame. In some embodiments, the pressure diaphragm may be configured to move along the frame in order to determine the pressure difference between the inlet port and the outlet port of the flow channel. For example, if the pressure is greater at the inlet port than at the outlet port, the pressure diaphragm may be configured to move along the frame in direction $D_1$. In some embodiments, the greater the pressure at the inlet port is than the pressure at the outlet port, the greater the pressure diaphragm moves in direction. As another example, if the pressure is greater at the outlet port than at the inlet port, the pressure diaphragm may be configured to move along the frame in direction $D_2$. In some embodiments, the greater the pressure at the outlet port is than the pressure at the inlet port 106, the greater the pressure diaphragm moves in direction $D_2$. As another example, if the pressure at the inlet port is equal to the pressure at the outlet port, the pressure diaphragm may be configured to stay in place (e.g., the pressure diaphragm does not move in direction $D_1$ or direction $D_2$).

As shown in block 630, the method 600 may include providing a first diaphragm disposed on the first port and a second diaphragm disposed on the second port. As described above, the first diaphragm may be disposed on the first port of the pressure sensor. In this regard, the first diaphragm may be disposed between the pressure sensor (e.g., the first port of the pressure sensor) and the pressure sensor tube such that the first diaphragm is in fluid communication with the inlet port. In some embodiments, the first diaphragm may be configured to prevent fluid (e.g., fluid from the fluid source, flow channel, etc.) from contacting the pressure sensor (e.g., the fluid does not contact the first port, enter the pressure sensor, contact the frame, and/or contact the pressure diaphragm). In some embodiments, the second diaphragm may be disposed on the second port of the pressure sensor. In this regard, the second diaphragm may be disposed between the pressure sensor (e.g., the second port of the pressure sensor) and the pressure sensor tube such that the second diaphragm is in fluid communication with the outlet port. In some embodiments, the second diaphragm may be configured to prevent fluid (e.g., fluid from the fluid source, flow channel, etc.) from contacting the pressure sensor (e.g., the fluid does not contact the second port, enter the pressure sensor, contact the frame, and/or contact the pressure diaphragm). Said differently, the first diaphragm and the second diaphragm may be configured to deflect based on the pressure at the inlet port and the outlet port, which causes the pressure diaphragm to correspondingly deflect without the pressure sensor (e.g., the first port, the second port, the pressure diaphragm, and/or the frame) coming into contact with the fluid. In this regard, the pressure sensor may be reused (e.g., the pressure sensor is non-invasive). For example, the pressure sensor may be reused with more than one fluid sources (e.g., with more than one human undergoing a peritoneal dialysis process).

As shown in block 640, the method 600 may include providing a computing device. As described above, the computing device may be configured to determine the flow rate of the fluid based at least on the pressure difference. In some embodiments, the flow rate of the fluid in the flow channel may be equal to the pressure difference between the inlet port and the outlet port (e.g., the pressure difference determined by the pressure sensor) divided by the resistance associated with the flow channel.

As shown in block 650, the method 600 may optionally include providing a camera. As described above, if the computing device determines that the flow rate of the fluid in the flow channel is approximately equal to zero, the system may be configured to analyze the fluid in the flow channel. For example, the camera and/or an optical light source (e.g., a laser beam) may capture one or more images of the fluid in the flow channel. For example, the camera and/or the optical light source may be configured to capture one or more holographic images of the fluid in the flow channel. In this regard, for example, the one or more images (e.g., holographic images) of the fluid in the flow channel may be used to determine a white blood cell count associated with the fluid and/or a red blood cell count associated with the fluid.

Example Computer Processing Device

Figure 7:
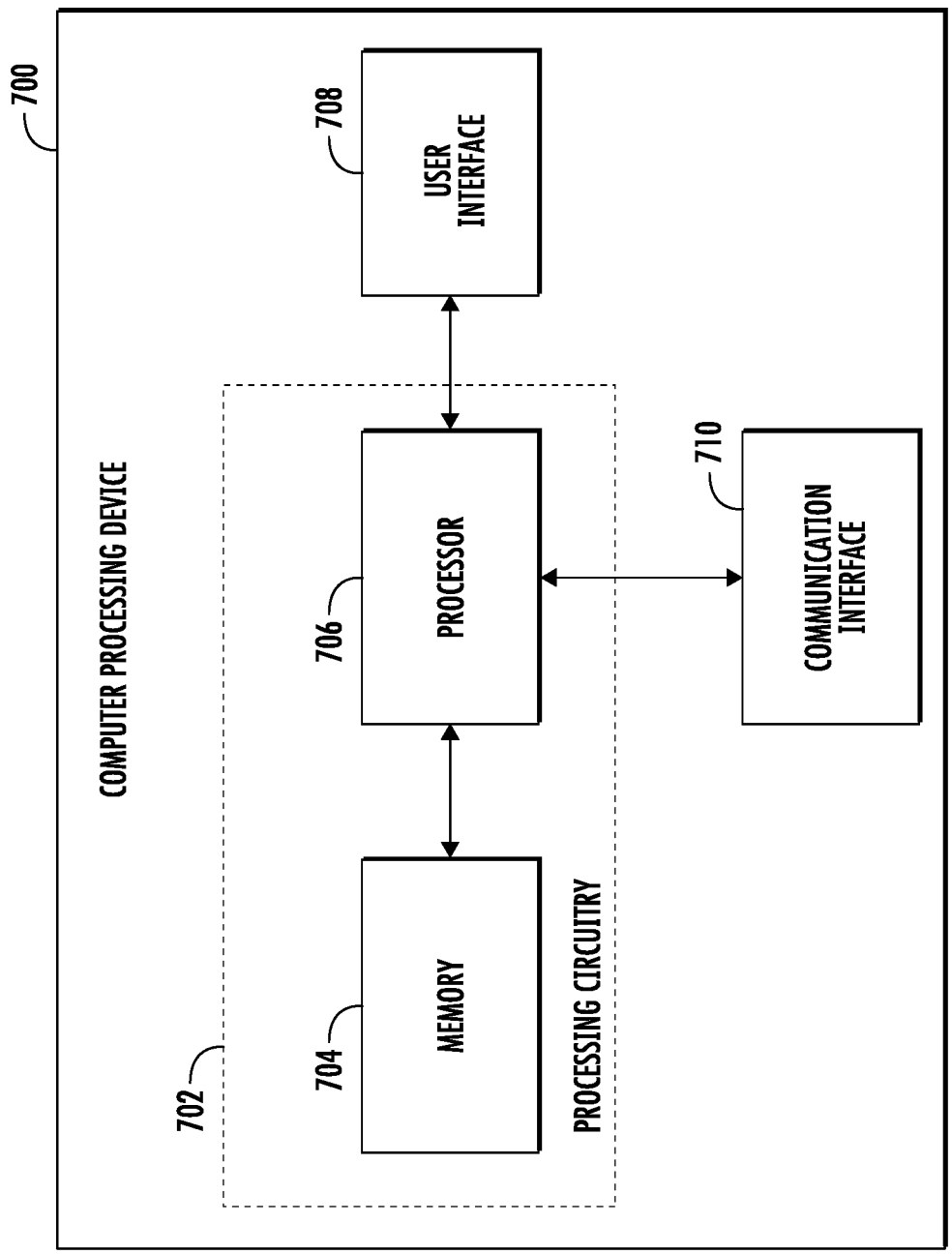
FIG. 7 illustrates a block diagram of an example computer processing device in accordance with one or more embodiments of the present disclosure.

With reference to FIG. 7, a block diagram of an example computer processing device 700 is illustrated in accordance with some example embodiments. In some embodiments, the computing device 126, and/or other devices (e.g., a computing device associated with pressure sensor 112) may be embodied as one or more computer processing devices, such as the computer processing device 700 in FIG. 7. However, it should be noted that the components, devices, or elements illustrated in and described with respect to FIG. 7 below may not be mandatory and thus one or more may be omitted in certain embodiments. Additionally, some embodiments may include further or different components, devices or elements beyond those illustrated in and described with respect to FIG. 7.

The computer processing device 700 may include or otherwise be in communication with processing circuitry 702 that is configurable to perform actions in accordance with one or more embodiments disclosed herein. In this regard, the processing circuitry 702 may be configured to perform and/or control performance of one or more functionalities of the computer processing device 700 in accordance with various embodiments, and thus may provide means for performing functionalities of the computer processing device 700 in accordance with various embodiments. The processing circuitry 702 may be configured to perform data processing, application execution and/or other processing and management services according to one or more embodiments. In some embodiments, the computer processing device 700 or a portion(s) or component(s) thereof, such as the processing circuitry 702, may be embodied as or comprise a chip or chip set. In other words, the computer processing device 700 or the processing circuitry 702 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 700 or the processing circuitry 702 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 702 may include a processor 706 and, in some embodiments, such as that illustrated in FIG. 7, may further include memory 704. The processing circuitry 702 may be in communication with or otherwise control a user interface 708 and/or a communication interface 710. As such, the processing circuitry 702 may be embodied as a circuit chip (e.g., an integrated circuit chip) configured (e.g., with hardware, software or a combination of hardware and software) to perform operations described herein.

The processor 706 may be embodied in a number of different ways. For example, the processor 706 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 706 may comprise a plurality of processors. The plurality of processors may be in operative communication with each other and may be collectively configured to perform one or more functionalities of the computer processing device 700 as described herein. In some embodiments, the processor 706 may be configured to execute instructions stored in the memory 704 or otherwise accessible to the processor 706. As such, whether configured by hardware or by a combination of hardware and software, the processor 706 may represent an entity (e.g., physically embodied in circuitry—in the form of processing circuitry 702) capable of performing operations according to embodiments of the present disclosure while configured accordingly. Thus, for example, when the processor 706 is embodied as an ASIC, FPGA or the like, the processor 706 may be specifically configured hardware for conducting the operations described herein. Alternatively, as another example, when the processor 706 is embodied as an executor of software instructions, the instructions may specifically configure the processor 706 to perform one or more operations described herein.

In some embodiments, the memory 704 may include one or more non-transitory memory devices such as, for example, volatile and/or non-volatile memory that may be either fixed or removable. In this regard, the memory 704 may comprise a non-transitory computer-readable storage medium. It will be appreciated that while the memory 704 is illustrated as a single memory, the memory 704 may comprise a plurality of memories. The memory 704 may be configured to store information, data, applications, instructions and/or the like for enabling the computer processing device 700 to carry out various functions in accordance with one or more embodiments. For example, the memory 704 may be configured to buffer input data for processing by the processor 706. Additionally or alternatively, the memory 704 may be configured to store instructions for execution by the processor 706. As yet another alternative, the memory 704 may include one or more databases that may store a variety of files, contents or data sets. Among the contents of the memory 704, applications may be stored for execution by the processor 706 in order to carry out the functionality associated with each respective application. In some cases, the memory 704 may be in communication with one or more of the processor 706, user interface 708, and/or communication interface 710 via a bus(es) for passing information among components of the computer processing device 700.

The user interface 708 may be in communication with the processing circuitry 702 to receive an indication of a user input at the user interface 708 and/or to provide an audible, visual, mechanical or other output to the user. As such, the user interface 708 may include, for example, a keyboard, a mouse, a joystick, a display, a touch screen display, a microphone, a speaker, and/or other input/output mechanisms. As such, the user interface 708 may, in some embodiments, provide means for a user to access and interact with the system 100 (e.g., the computing device 126).

The communication interface 710 may include one or more interface mechanisms for enabling communication with other devices and/or networks. In some cases, the communication interface 710 may be any means such as a device or circuitry embodied in either hardware, or a combination of hardware and software that is configured to receive and/or transmit data from/to a network and/or any other device or module in communication with the processing circuitry 702. By way of example, the communication interface 710 may be configured to enable the computing device 126 to communicate with the pressure sensor 112, the camera 128, and/or other computing devices. Accordingly, the communication interface 710 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A system comprising:
    a flow channel having an inlet port and an outlet port, wherein the flow channel is configured to receive a fluid via the inlet port and discharge the fluid via the outlet port;
    a pressure sensor having a first port and a second port;
    a first pressure sensor tube coupled to the first port;
    a second pressure sensor tube coupled to the second port;
    a first diaphragm disposed between the first port and the first pressure sensor tube and a second diaphragm disposed between the second port and the second pressure sensor tube, wherein the first diaphragm is in fluid communication with the inlet port and the second diaphragm is in fluid communication with the outlet port, wherein the pressure sensor comprises a pressure diaphragm and a frame, wherein the pressure diaphragm is configured to move along the frame to determine a pressure difference between the inlet port and the outlet port; and
    a computing device, the computing device configured to determine a flow rate of the fluid based at least on the pressure difference.

2. The system of claim 1, wherein the first diaphragm and the second diaphragm are configured to prevent the fluid from contacting the pressure sensor.

3. The system of claim 1, wherein the flow channel is substantially rectangular or substantially cylindrical.

4. The system of claim 3, wherein the flow channel is associated with a first resistance when the flow channel is substantially rectangular and a second resistance when the flow channel is substantially cylindrical.

5. The system of claim 1, wherein the pressure difference is equal to a difference between a first pressure associated with the first port and a second pressure associated with the second port.

6. The system of claim 1, further comprising a camera, wherein the camera is configured to capture one or more images of the fluid when the fluid is in the flow channel.

7. The system of claim 6, wherein the camera is configured to capture the one or more images of the fluid when the flow rate is equal to zero.

8. A method of manufacturing, the method comprising:
    providing a flow channel having an inlet port and an outlet port, wherein the flow channel is configured to receive a fluid via the inlet port and discharge the fluid via the outlet port;
    providing a pressure sensor having a first port and a second port;
    providing a first pressure sensor tube coupled to the first port;
    providing a second pressure sensor tube coupled to the second port;
    providing a first diaphragm disposed between the first port and the first pressure sensor tube and a second diaphragm disposed between the second port and the second pressure sensor tube, wherein the first diaphragm is in fluid communication with the inlet port and the second diaphragm is in fluid communication with the outlet port, wherein the pressure sensor comprises a pressure diaphragm and a frame, wherein the pressure diaphragm is configured to move along the frame to determine a pressure difference between the inlet port and the outlet port; and providing a computing device, the computing device configured to determine a flow rate of the fluid based at least on the pressure difference.

9. The method of claim 8, wherein the first diaphragm and the second diaphragm are configured to prevent the fluid from contacting the pressure sensor.

10. The method of claim 8, wherein the pressure difference is equal to a difference between a first pressure associated with the first port and a second pressure associated with the second port.

11. The method of claim 8, further comprising:
providing a camera, wherein the camera is configured to capture one or more images of the fluid when the flow rate is equal to zero.

* * * * *